United States Patent [19]
Denis et al.

[11] 3,809,469
[45] May 7, 1974

[54] SLIDE CARRIER CYCLING MECHANISM FOR OPTICAL PROJECTORS AND THE LIKE

[75] Inventors: Englebert Denis, Dilbeek; Leon De Bondt, Hingene-Wintam, both of Belgium

[73] Assignee: GAF Corporation, New York, N.Y.

[22] Filed: Oct. 27, 1971

[21] Appl. No.: 192,880

[30] Foreign Application Priority Data
Oct. 28, 1970 Belgium .................................. 95683

[52] U.S. Cl. ............................... 353/106, 353/116
[51] Int. Cl. ..................... G03b 23/02, G03b 23/04
[58] Field of Search ........... 353/103, 106, 105, 114, 353/115, 116; 40/79

[56] References Cited
UNITED STATES PATENTS

| | | | |
|---|---|---|---|
| 3,535,034 | 10/1970 | Sauer | 353/106 |
| 1,082,260 | 12/1913 | Braun | 353/103 |
| 2,784,817 | 3/1957 | Lessman | 353/116 |
| 2,843,951 | 7/1958 | Richards | 353/117 |
| 3,362,288 | 1/1968 | Hirosawa | 353/106 |

Primary Examiner—Louis R. Prince
Assistant Examiner—A. Jason Mirabito
Attorney, Agent, or Firm—W. C. Kehm; S. B. Leavitt

[57] ABSTRACT

A cycling mechanism including a solenoid actuated clutch for periodically linking a continuously operating drive motor and a reciprocable slide changer is provided. The cycling mechanism comprises a rotatable clutch disk adapted to be continuously driven by a motor, an electromagnetic solenoid fixedly disposed about the hub of the clutch disk, a drive crank having a drive pin adapted to engage a corresponding cam on the slide changer to cyclically reciprocate the same disposed in an axial spaced apart relationship with respect to the clutch disk and mounted for both rotational and axial movement. Upon energization of the solenoid the drive crank is attracted thereto and moved axially into engagement with the clutch disk for rotation therewith, to drive the slide changer. Means are also provided to automatically return the drive crank to a neutral non-rotating position at the end of each revolution of the crank, corresponding to a complete slide changing cycle.

16 Claims, 4 Drawing Figures

SLIDE CARRIER CYCLING MECHANISM FOR OPTICAL PROJECTORS AND THE LIKE

BACKGROUND OF THE INVENTION

The present invention relates to a slide projector of the type having a slide carrier which is reciprocable in a direction transversely of the optical axis of the projector for advancing slides from a slide tray to a viewing position in the projector and then returning such slides to the slide tray.

In projectors of this type it is desirable that the drive mechanism for the slide carrier be designed to automatically stop the transverse movement of the carrier when a slide has been positioned within the projector gate. It is common practice to automatically reciprocate the slide carrier by means of an electric motor adapted to rotate a drive crank having an eccentric pin which operably engages a vertical slot formed in one end of the slide carrier. An automatic stop switch actuated by the slide carrier when it reaches its innermost position upon the transfer of a slide to the viewing position stops the motor until such time as it is again energized either manually or by an automatic timer device to advance the next slide into the viewing position. This type of cycling mechanism has the disadvantage of requiring the stopping and starting of the motor for each of the slides in the magazine. As a result, the motor cannot be used to perform other functions, such as the cooling of the apparatus, and thus at least one additional motor is required to perform the cooling function.

Attempts have been made to provide a continuously operating drive motor linked to the slide changing device by means of suitable clutch means. In this manner, the drive motor can also operate a cooling fan, and the slide changing mechanism can be cyclically operated by actuating the clutch to effectuate a drive connection between the motor and the slide changing means. An electromagnetic clutch adapted to operate in the mode described is disclosed in U.S. Pat. No. 3,362,288. Unfortunately, however, there are many inherent deficiencies in the electromagnetic device disclosed in said patent. For example, the electromagnet itself comprises one of the rotatable drive gears of the clutch, so that upon energization it operatively engages a rotating drive plate linked to the motor. This requires the use of brushes which slidably engage suitable contact points on the electromagnet to provide electrical current thereto. Contacts of this type are subject to wear, and tend not to perform satisfactorily throughout the useful life of the projector. In addition, there are no positive means provided in said patent to disengage the electromagnet and the drive plate connected to the motor. Upon de-energization of the electromagnet the plate is urged only by gravity out of engagement therewith. Similarly, there are no automatic means provided for de-energizing the electromagnet. The patent discloses merely a push-button switch which is actuated and must remain actuated throughout a slide changing cycle and which must be released at the proper moment at the end of the cycle to insure that a slide will be positioned in the projection gate.

SUMMARY OF THE INVENTION

In accordance with the present invention, an automatic slide carrier cycling mechanism for use in optical projectors is provided which overcomes the inherent deficiencies found in prior devices of this type. The cycling mechanism of the invention utilizes an electromagnetic solenoid clutch means for periodically linking a continuously operating drive motor and a slide carrier. The solenoid is fixedly mounted within the cycling mechanism, and is in no way adapted to be rotated together with any of the driving gears or plates thereof. This permits the utilization of direct electrical connection between the energizing circuit and the solenoid and overcomes the possibility of premature wear.

In addition, single cycle control means are associated with the solenoid clutch to positively disengage the slide carrier from the drive motor upon the completion of one full slide changing cycle, which is defined as returning a slide from the projection gate to the slide magazine, and advancing the next slide into the projection gate. In this manner, the slide carrier is automatically deactivated in the proper position without the need for stopping the drive motor or releasing a motor switch at the appropriate moment to insure proper alignment.

In general, the slide carrier cycling mechanism of the invention comprises, in combination, a rotatable clutch disk assembly operatively linked to a drive motor, a rotatable drive crank adapted to engage and reciprocably move a slide carrier through a slide changing cycle, said crank being mounted in spaced apart juxtaposition with respect to said clutch disk assembly and axially movable between a normally neutral position out of engagement with said clutch disk assembly and an operative position in engagement with said clutch disk assembly for rotation therewith; electromagnetic means fixedly disposed adjacent the clutch disk assembly and adapted upon energization to magnetically urge said drive crank into its operative position to reciprocate said slide carrier; electrical circuit means to provide energizing current to said electromagnetic means; and single cycle control means associated with said drive crank and adapted to secure the drive crank in its operative position upon energization of the electromagnetic means, and to stop the drive crank and permit its return to the neutral position upon completion of a single slide changing cycle.

The clutch disk assembly is provided with means for engaging the drive motor, such as a pulley for a belt drive, a gear train or a combination of both, and includes means for operatively engaging the drive crank upon energization of the electromagnetic means. In the preferred embodiment, the clutch disk assembly comprises a clutch gear operatively linked to the drive motor and having a central cylindrical hub portion which is rotatably mounted on a hollow axle, and a clutch disk attached to one end of the hub for rotational movement therewith, and having a plurality of radially disposed upstanding tabs or projections.

The drive crank, which is provided with a corresponding tab or similar means to engage one of the upstanding tabs of the clutch disk upon its movement into the operative position can be mounted on the end of a shaft slidably disposed within the hollow axle for axial and rotational movement. Biasing means, such as a spring, is preferably provided to urge the drive crank into its neutral position out of engagement with the clutch disk. Suitable eccentric drive connecting means, such as a drive pin adapted to engage a corresponding slot, or a pivotally mounted arm, are associated with the drive crank to engage the slide carrier to effectuate reciprocating movement thereof upon rotation of the drive crank.

The electromagnetic means is fixedly disposed in the annular space defined by the cylindrical hub of the clutch gear, and is preferably annular in shape. The magnetic force field established by the electromagnetic means upon its energization is of sufficient intensity to overcome the force of the biasing means and axially urges the drive crank into its operative position, resulting in the engagement of the corresponding tabs on the clutch disk and the drive crank.

The single cycle control means can be, simply, a disk or an arm fixedly mounted on the end of the drive crank shaft opposite from the drive crank, and having an eccentric upstanding stop pin attached to or formed as a part thereof. A fixedly disposed bearing plate which can be a part of a housing for the clutch disk assembly, is provided with a positioning hole therein which is adapted to receive the stop pin when the drive crank is positioned in a manner such that the slide carrier is at the end of a slide changing cycle with a slide transparency positioned in the projection gate. Upon energization of the electromagnetic means the drive crank is moved into its operative position and the stop pin on the control means is retracted from the positioning hole. Upon de-energization of the electromagnetic means, the drive crank is not permitted to return to its neutral position until a slide changing cycle has been completed, since the stop pin on the disk bears against and rides along the bearing plate surface. In this manner, all that is required to energize the cycling mechanism so that it will drive the slide changing means through one complete cycle, is a short pulse of electrical current to the electromagnetic means. Once the drive crank engages the clutch disk and begins its rotational movement, the stop pin prevents its return to the neutral position until the cycle has been fully completed.

Other details and features of the invention will become apparent from the following description of the accompanying figures which show by way of example a preferred embodiment of the projector of the invention.

DESCRIPTION OF THE PREFERRED EMBODIMENT

Figure 1:
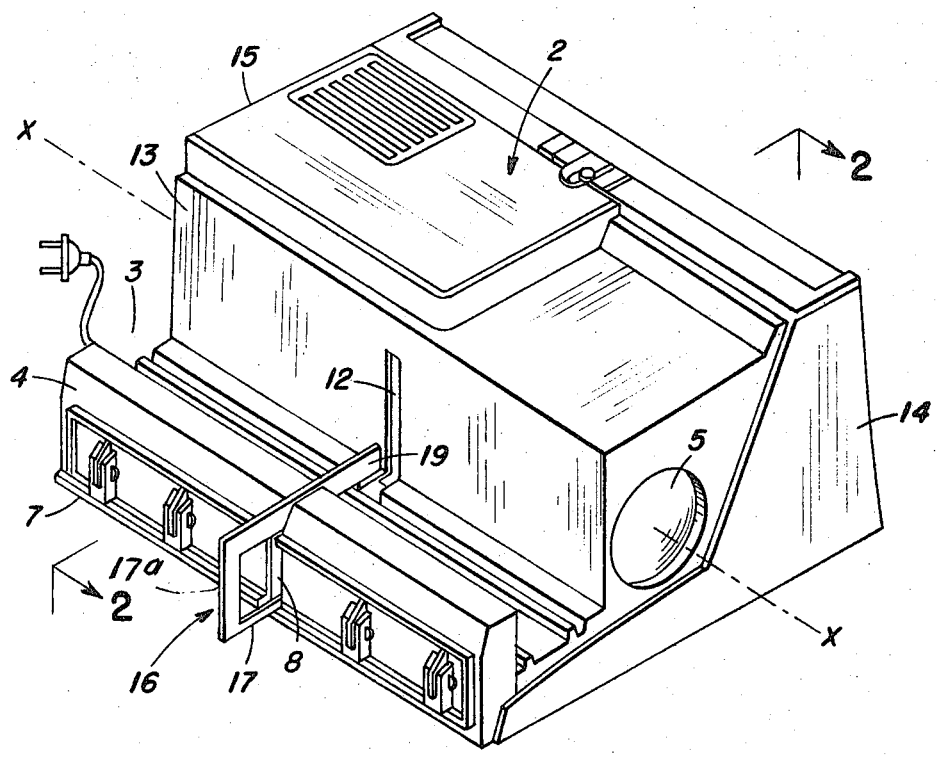
FIG. 1 is a perspective view of a slide projector incorporating the cycling mechanism of the invention.

As shown in FIG. 1 the preferred embodiment of the projector of the present invention includes a base plate 1 and a projector housing 2 having side walls 4. The housing 2 is provided with slide tray receiving channel or trough-like groove 3 which extends along one side thereof and is open at its top and at its forward and rear ends for receiving a known type of box-like slide tray 6, in which a plurality of slides or transparencies may be stored. Slide tray 6 is formed of an upper wall 8 and a lower wall 9 connected together by transverse partitions 10 uniformly spaced apart from each other by a distance approximately equal to the thickness of the frame 11 of the slides 7 contained therein.

The optical axis of the projector is indicated by a broken line in FIG. 1 and as is well known in the art, a lamp, reflectors, condenser lenses and projector gate (not shown), along with a focusing lens 5 are disposed in the housing 2 in line with the optical axis thereof. A blower including a fan wheel (not shown) can be provided for inducing the flow of air past the projection lamp to substantially reduce the temperature within the housing 2, and thus prevent damage to the slides or transparencies being shown therein.

A vertically extending slide aperture 12 is formed in a wall 13 of the housing 2 which partially defines groove 3. The aperture 12 is positioned approximately midway between the front wall 14 and the rear wall 15 of the housing 2, and functions to permit the transfer of slides 7 from the slide tray 6 to the projection gate on the optical axis of the projector, and to permit the return of such slides to the slide tray.

A slide carrier 16 is mounted for reciprocable sliding movement transversely of the optical axis to transfer slides between the slide tray 6 and the projection gate. Slide carrier 16 is characterized by an elongated bar member 17 supported for sliding movement by guide blocks 18, a handle member 17a which extends upwardly from the outer end of the bar member 17, a pusher arm 19 which extends inwardly from the upper end of the handle member 17a toward the optical axis of the projector in parallel spaced arrangement above the bar member 17, and by a vertically disposed plate member 20 which is secured by suitable fastening means to 21 to the opposite end of the bar member 17. A generally flat J-shaped member 22 formed of nylon or some other suitable low friction material has a long vertical leg or element 44 secured to the forward surface to the plate member 20 along the outer edge thereof, with a short vertical leg or element 44a being spaced away from the outer edge of the plate 20 to define a vertically extending slot 23 disposed closely adjacent to the outer edge of the plate 20. The J-shaped member 22, which is commonly referred to as a J-bar, serves as a linking member between the cycling mechanism of the invention and the slide carrier 16, and is more fully described in U.S. Pat. No. 3,183,774 to Kurz.

The cycling mechanism of the invention which reciprocates the slide carrier 16 includes a rotatable drive crank 41 formed of ferromagnetic material and an eccentric drive pin 43 attached to one end of the crank. The pin engages slot 23 of J-bar 22 on the slide carrier to reciprocally move the slide carrier through a slide changing cycle upon rotational movement of crank 41. At the end of each slide changing cycle, which corresponds to one crank revolution, drive pin 43 is positioned above the top end of short vertical leg 44a to automatically disengage slot 23 of the J-bar. In this manner the slide carrier may be operated manually by means of handle 17a.

The slide projector utilizes a single electric motor (not shown) to drive the cycling mechanism and to operate a cooling fan (not shown). Accordingly, when the projector is in use the motor continuously operates during all phases of the projection cycle to ensure proper cooling. The drive crank, however, is operated intermittently only when it is desired to change a slide. Such intermittent operation of the cycling mechanism is accomplished by an electrically operated solenoid clutch means which is described below.

Figure 2:
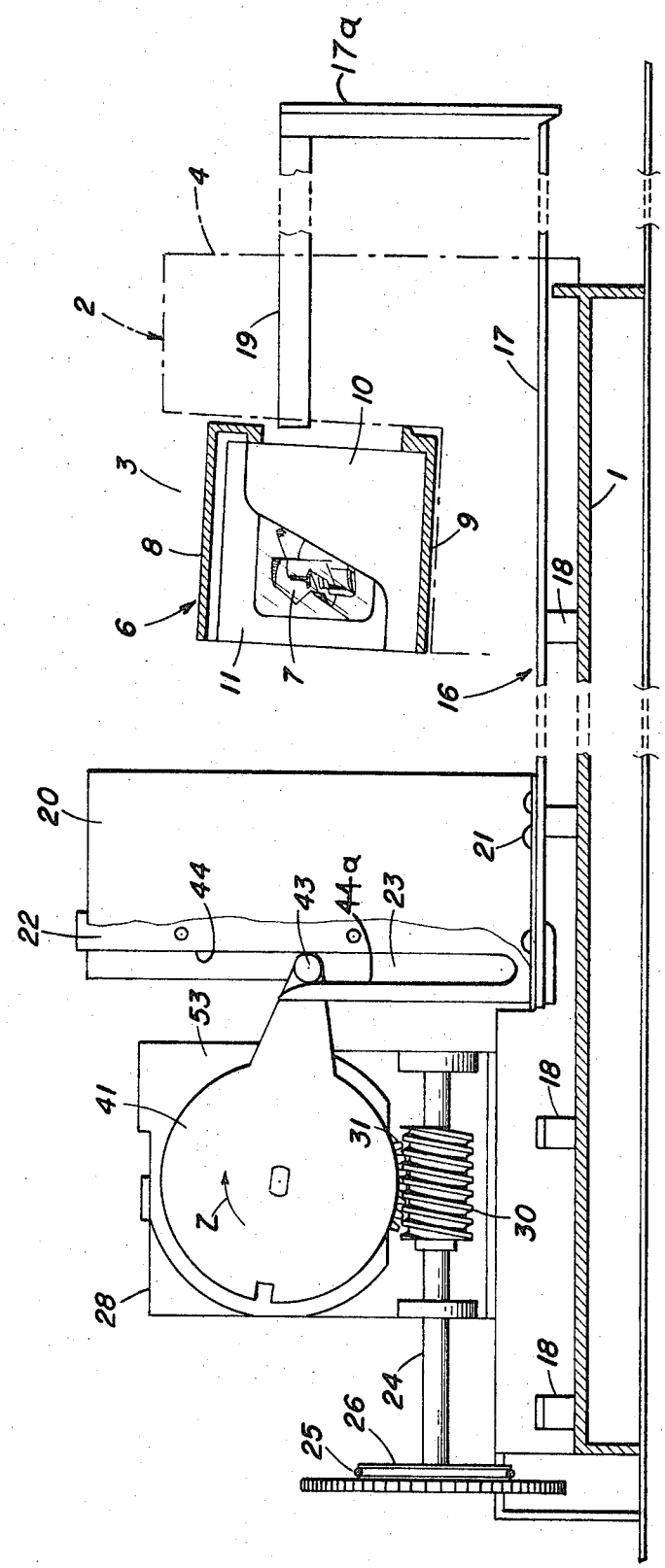
FIG. 2 is a cross-sectional view perpendicular to the optical axis taken along the lines 2—2 of FIG. 1.
Figure 3:
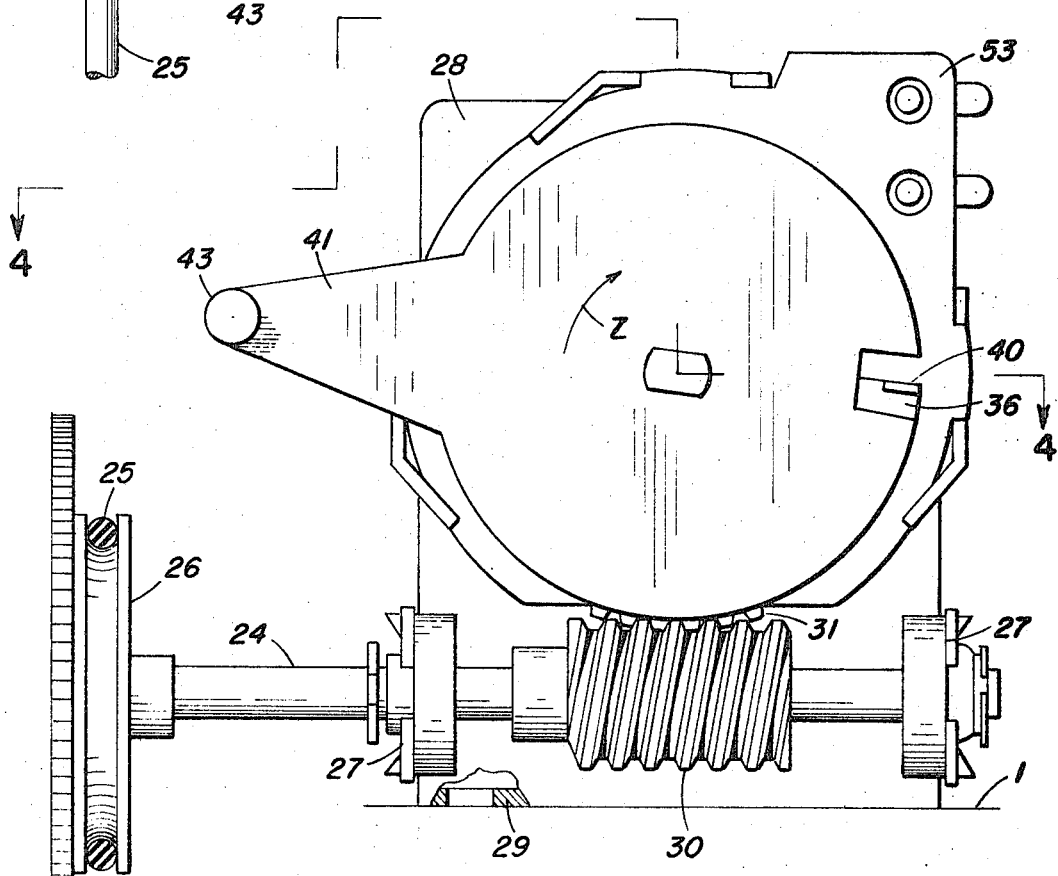
FIG. 3 shows an enlarged side view of the cycling mechanism of the invention.

As shown in FIGS. 2 and 3 the means for connecting the motor to the cycling mechanism comprises a pulley 26 connected by an o-ring type belt 25 to a corresponding pulley on the motor. The pulley 26 is attached to a worm gear 30 by means of a shaft 44, which is rotatably mounted on an upstanding mounting plate 28 by means of two bearings 27 fastened to the ends of plate 28. Plate 28 is provided with a horizontal flange 29 for attachment to base plate 1 of the projector.

Figure 4:
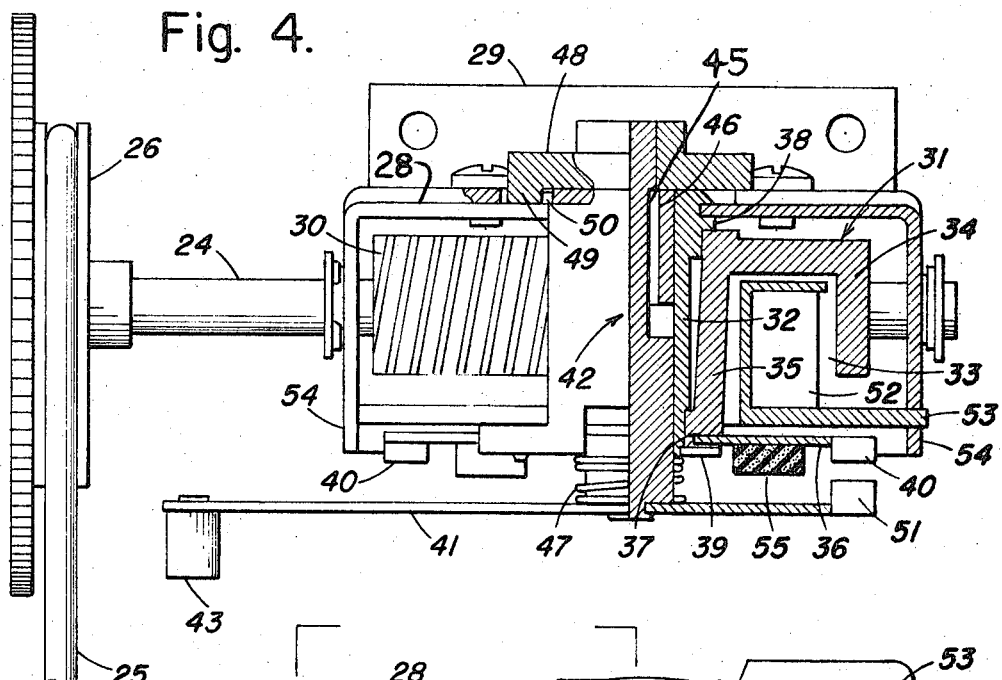
FIG. 4 is a cross-sectional view taken along the lines 4—4 of FIG. 3.

A clutch gear 31 disposed in operative engagement with worm gear 30 is rotatably mounted via cylindrical hub 35 on the exterior of a hollow axle 32 which, as shown in FIG. 4, is rigidly secured to plate 28. The clutch gear 31 is shaped in such a manner so as to have an annular recess 33 between its toothed outer periphery 34 and the cylindrical hub 35. A clutch disk 36 having a plurality of equally spaced upstanding tabs 40 is mounted on one end of the cylindrical hub 35 for rotation therewith. The clutch disk 36 is held in proper alignment with the clutch gear 31 by means of a rectangularly shaped shoulder 37 formed at the end of the cylindrical hub 35, and which passes through a corresponding rectangular opening in disk 36. Both the clutch gear 31 and the clutch disk 36 are held in place on the hollow axle 32 between an annular step 38 formed at one end of the axle and an elastic retainer ring 39 disposed on the other end of the axle.

Crank 41 is fixedly secured to one end of a shaft 42 which is slidably disposed within the hollow axle 32 for rotational movement, and for axial movement between an operative position in contact with clutch disk 36 for rotation therewith and a neutral nonrotating position as shown in FIG. 4. A crank sprocket 51 on crank 41 in a position diametrically opposite from drive pin 43 engages any one of the tabs 40 on the clutch disk 36 in the operative position of the crank, to provide a drive connection. The shaft 42 has a reduced diameter portion 45 which permits free axial sliding of the shaft 42 within the hollow axle 32 until it bears against a fixed annular stop 46, which controls the amount of engagement of the tabs 40 and the crank sprocket 51. A spring 47 disposed about shaft 47 and extending between the end of axle 32 and crank 41 biases crank 41 toward the neutral position out of engagement with the clutch plate 36.

An electro-magnetic solenoid 52 is fixedly disposed in the annular recess 33 of cycle gear 31 by means of a support member 53 fastened to transverse legs 54 of the plate 28. The solenoid 52 is operative to electromagnetically urge crank 41 over the force of spring 47 into its operative position for rotational movement. Flexible bumpers 55 are provided on the clutch disk 36 or on the crank 41 to dampen the impact of the crank against the clutch disk under the effect of the attraction of electromagnet 52.

An electrical circuit (not shown) is provided to energize the electromagnet 52. A suitable switch control can be provided in the circuit to permit manual actuation of the solenoid to effectuate a slide changing cycle.

The clutch mechanism includes single cycle control means adapted to secure the crank in its operative position for one revolution thereof when the solenoid is actuated, to stop the crank in the proper position with a slide in the projection gate and then to permit spring 47 to return the crank to the neutral position. A disk 48 fixedly secured to the end of shaft 42 opposite from the crank has an eccentric stop pin 49 formed thereon and extending toward mounting plate 28. A positioning slot or opening 50 is provided in mounting plate 28 as shown in FIG. 4 to receive stop pin 49 when the crank is positioned such that the slide carrier 16 is at the end of a slide changing cycle with a slide 7 positioned in the projection gate and the crank drive pin 43 out of engagement with the slot 23 of J-bar 22. It is apparent that when the stop pin engages the opening 50, the disk 48, shaft 42 and crank 41 can no longer rotate, and are returned to the neutral position by the biasing force of spring 47. Accordingly, rotation of crank 41 is possible only when stop pin 49 disengages slot 50, and the crank is stopped only when the pin re-engages the slot. The solenoid is adapted to be energized by one-half second electrical pulses. Such a pulse is sufficient to urge crank 41 into the operative position thereby disengaging pin 49 from slot 50. As rotation commences pin 49 is moved out of alignment with slot 50, so that when the solenoid pulse ceases spring 47 cannot return the crank to the neutral position. Pin 49 is merely biased against the base of plate 28 and slides thereupon holding the crank in the operative position. After one complete revolution corresponding to one cycle of the slide carrier 16, pin 49 is again aligned with slot 50 and is urged into engagement therewith by spring 47. The engagement permits axial movement of shaft 42 and results in the disengagement of crank 41 and the clutch disk 36.

As an alternate single cycle control means, a circular pin can be radially attached to the end of shaft 42 in the approximate location of the disk 48. A corresponding radial slot can be formed in plate 28 to receive the pin in one radial position.

In a further alternative embodiment, the electromagnet 52 can be connected to a circuit having a switch means which is adapted to be manually closed and automatically opened upon the completion of one revolution of the crank. The switch can be actuated by the crank or the slide carrier at the end of a slide changing cycle.

In operation the motor operates continuously so as to rotatably drive the clutch disk 36. In order to advance a slide 7 from the tray 6 to the projection position, the switch is actuated to provide an electrical pulse to the solenoid 52. Under the influence of the magnetic field thus developed, the crank 41 is moved into its operative position against the action of spring 47, stop pin 49 is released from opening 50, and sprocket 51 on the crank is intercepted by one of the corresponding tabs 40 on clutch disk 36, so that the crank is rotatably driven in the direction indicated by the arrows Z in FIGS. 2 and 3 to effectuate a reciprocating movement of the slide carrier 16. When the stop pin 49 is again aligned with opening 50 in the plate, the crank 41 is automatically stopped and returned to its neutral position.

Although the cycling mechanism of the present invention has been described primarily with reference to a single embodiment, modifications within the scope of this invention will be apparent to those skilled in the art.

What is claimed is:

1. In a slide projector of the type having a slide carrier slidably disposed for reciprocating movement transversely of the optical axis to transfer a slide from a slide tray to a viewing position on the optical axis and return the same to the slide tray, a slide carrier cycling mechanism comprising, in combination, a drive motor; a rotatable clutch disk assembly operatively linked to said drive motor; a rotatable drive crank adapted to engage and reciprocably move the slide carrier through a slide changing cycle, said crank being mounted in spaced apart juxtaposition with respect to said clutch disk assembly and axially movable between a normally neutral position out of engagement with said clutch disk assembly and an operative position in engagement with said clutch disk assembly for rotation therewith; electromagnetic means fixably disposed adjacent said clutch disk assembly and adapted upon energization to magnetically urge said drive crank into its operative position to reciprocate said slide changer; electrical circuit means to provide energizing current to said electro-magnetic means; and non-electrical single cycle control means associated with said drive crank and adapted to mechanically secure the drive crank in its operative position upon energization of the electromagnetic means and to automatically stop the drive crank and permit its return to the neutral position upon completion of a single slide changing cycle.

2. A cycling mechanism according to claim 1, in which the clutch disk assembly comprises a rotatable clutch gear operatively linked to the drive motor having a central hub portion; and a clutch disk fixedly attached to one end of the central hub portion for rotational movement therewith; said disk having means for engaging the drive crank in the operative position thereof.

3. A cycling mechanism according to claim 2, in which the means on said clutch disk for engaging the drive crank comprises a plurality of radially disposed upstanding tabs.

4. A cycling mechanism according to claim 3, in which the drive crank has at least one sprocket adapted to engage the upstanding tabs of the clutch disk upon its movement into the operative position.

5. A cycling mechanism according to claim 2, in which the electromagnetic means is a solenoid fixedly disposed in the annular space defined by the hub of the clutch disk assembly.

6. A cycling mechanism according to claim 5, in which the solenoid is annular in shape.

7. A cycling mechanism according to claim 1, in which the clutch disk assembly is rotatably mounted on a hollow axle; and the drive crank includes a shaft which slidably engages said hollow axle.

8. A cycling mechanism according to claim 7, further including a bearing plate having a positioning hole formed therein; and the single cycle control means comprises a disk fixedly mounted on the end of the drive crank shaft opposite from the drive crank and having an eccentric upstanding stop pin attached thereto and adapted to slide along the bearing plate to hold the drive crank in its operative position upon energization of the electromagnetic means and to engage the positioning hole to stop the drive crank and permit it to return to the neutral position upon completion of a single slide changing cycle.

9. A cycling mechanism according to claim 8, further including biasing means positioned to urge the drive crank into its neutral position.

10. An automatic cycling mechanism for reciprocating a slide carrier of an optical projection device or the like through a slide changing cycle comprising, in combination, a drive motor; a clutch housing; a clutch disk assembly rotatably mounted within said housing and having means for operatively engaging the drive motor for continuous rotation therewith; a rotatable drive crank adapted to engage and reciprocably move the slide carrier through said slide changing cycle, said crank being mounted in spaced apart juxtaposition with respect to said clutch disk assembly and axially movable between a normally neutral position out of engagement with said clutch disk assembly and an operative position in engagement with said clutch disk assembly for rotation therewith; an electromagnetic solenoid fixedly disposed within said housing adjacent the clutch disk assembly and adapted upon energization to magnetically urge the drive crank into its operative position to reciprocate said slide carrier; and non-electrical single cycle control means associated with said drive crank and adapted to mechanically secure the drive crank in its operative position upon energization of the solenoid to stop the drive crank and permit its return to the neutral position upon completion of said single slide changing cycle.

11. A cycling mechanism according to claim 10, in which the clutch disk assembly comprises a clutch gear for operatively engaging the drive motor having a central cylindrical hub portion rotatably mounted on a hollow axle; and a clutch disk attached to one end of the hub for rotational movement therewith, said disk having means to engage the drive crank in its operative position.

12. A cycling mechanism according to claim 11, in which the drive crank is mounted on the end of a drive crank shaft which slidably engages the hollow axle for rotational and axial movement therein.

13. A cycling mechanism according to claim 12, in which the means on the clutch disk for engaging the drive crank comprises a plurality of radially disposed upstanding tabs; and the drive crank has at least one sprocket formed therein and adapted to engage the corresponding tabs of the clutch disk upon its movement into the operative position.

14. A cycling mechanism according to claim 13, further including biasing means to urge the drive crank into its neutral position.

15. A cycling mechanism according to claim 14, in which the housing includes a positioning hole on the outer surface thereof radially spaced apart from said hollow axle; and the single cycle control means includes an eccentric stop pin attached to the drive crank shaft at the end opposite from the drive crank and adapted to slidably engage the outer surface of the housing to hold the drive crank in its operative position upon energization of the electromagnetic means, and to engage the positioning hole in the housing to stop the drive crank and permit its return to the neutral position upon completion of a single slide changing cycle.

16. A cycling mechanism according to claim 11, in which the solenoid is annular in shape and is disposed in the annular space defined by the clutch gear hub.

* * * * *